United States Patent [19]
Rawls

[11] Patent Number: 5,644,182
[45] Date of Patent: Jul. 1, 1997

[54] END CAP AND BRUSH HOLDER ASSEMBLY FOR DYNAMOELECTRIC MACHINE

[75] Inventor: Earl W. Rawls, Columbus, Miss.

[73] Assignee: United Technologies Automotive, Inc., Dearborn, Mich.

[21] Appl. No.: 551,569

[22] Filed: Nov. 1, 1995

Related U.S. Application Data

[63] Continuation of Ser. No. 176,020, Dec. 30, 1993, Pat. No. 5,471,107.

[51] Int. Cl.$^6$ ................................. H02K 13/00
[52] U.S. Cl. ................ 310/249; 310/42; 310/239; 310/247; 310/248
[58] Field of Search .......................... 310/239, 247, 310/248, 249, 42

[56] References Cited

U.S. PATENT DOCUMENTS

| | | | |
|---|---|---|---|
| 1,378,565 | 5/1921 | Schou | 310/239 |
| 1,401,679 | 12/1921 | Dillin | 310/239 |
| 2,637,826 | 5/1953 | Humphrey | 310/247 |
| 3,176,177 | 3/1965 | Huston | 310/247 |
| 3,967,148 | 6/1976 | Walsh | 310/239 |
| 4,095,131 | 6/1978 | Febonio | 310/239 |
| 4,329,612 | 5/1982 | Averill | 310/247 |
| 4,694,214 | 9/1987 | Stewart, Sr. | 310/239 |
| 4,855,631 | 8/1989 | Sato et al. | 310/239 |
| 4,859,894 | 8/1989 | Akutsu et al. | 310/239 |
| 5,148,073 | 9/1992 | Tamura | 310/239 |
| 5,184,041 | 2/1993 | Baer et al. | 310/239 |
| 5,198,712 | 3/1993 | Bolzan, Jr. et al. | 310/242 |

FOREIGN PATENT DOCUMENTS 2027282  2/1980  United Kingdom ............... 310/239

OTHER PUBLICATIONS

Design Handbook for DuPont Engineering Polymers, Module 1, General Design Principles, "Assembly Techniques", pp. 104–108 (prior to 1991).

*Primary Examiner*—Thomas M. Dougherty
*Assistant Examiner*—K. L. E. Tamai
*Attorney, Agent, or Firm*—Harness, Dickey & Pierce, P.L.C.

[57] ABSTRACT

A brush holder apparatus and method for biasing a brush outwardly of a brush box. A brush box cover is slidingly disposed over an electrical cable along with a coil spring. Next, a brush shunt is electrically secured to an end portion of the electrical cable by a crimp member. The brush box cover is then slidably urged towards a brush secured at a terminal end of the brush shunt. This causes the brush shunt to be folded so as to place it in general longitudinal alignment and parallel with the electrical cable. The brush box cover is then further slid along the electrical cable, thus urging the spring over the brush shunt and into engagement with the brush electrically secured at the terminal (i.e., outer) end portion of the brush shunt. The brush box cover is further slid along the electrical cable until the crimp member and a portion of the brush shunt become wedgingly engaged in a portion of the brush box cover, to thereby hold the spring in a compressed condition between the brush box cover and the brush. Accordingly, there is no need to first compress the spring and hold the spring compressed while the brush shunt is attached to the electrical cable. The apparatus and method significantly eases the manner in which a brush holder may be assembled.

19 Claims, 1 Drawing Sheet

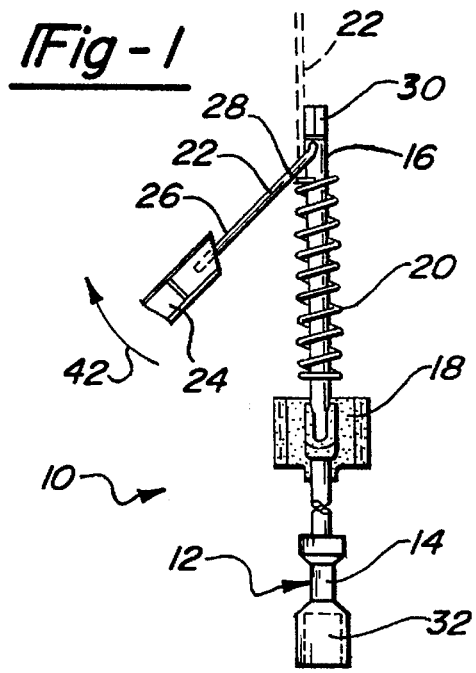
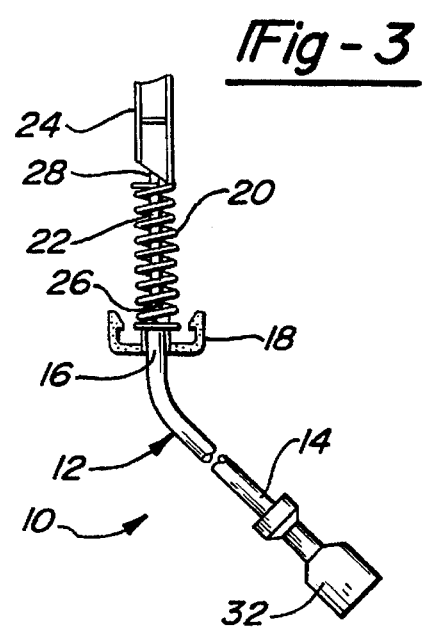
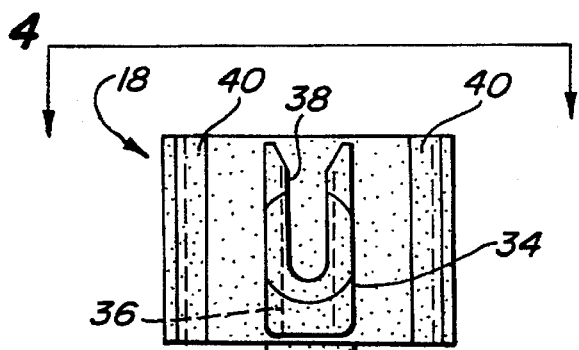
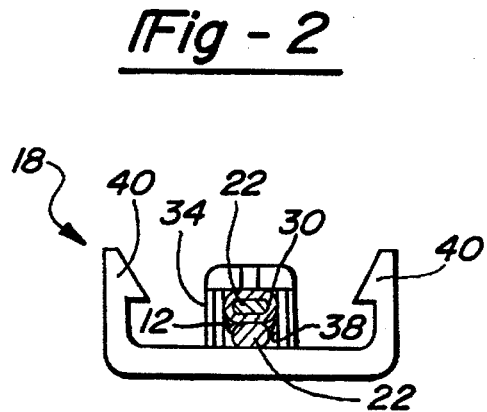
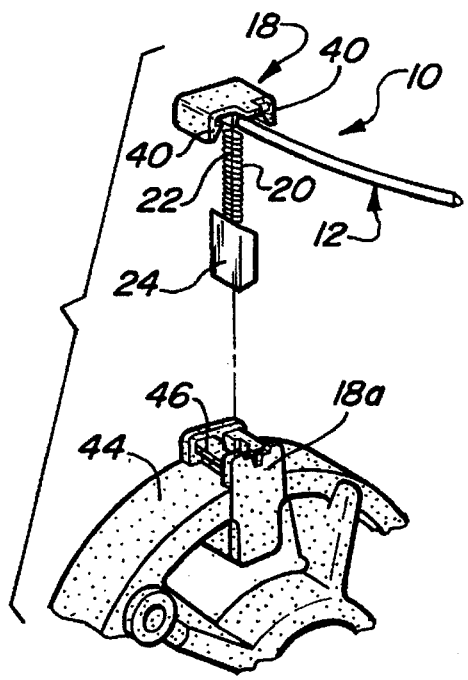

END CAP AND BRUSH HOLDER ASSEMBLY FOR DYNAMOELECTRIC MACHINE

This is a continuation of U.S. patent application Ser. No. 08/176,020, filed Dec. 30, 1993 which issued as U.S. Pat. No. 5,471,107.

BACKGROUND OF THE INVENTION

1. Technical Field

This invention relates to dynamoelectric machines and, more particularly, to an apparatus for biasing a brush of the machine towards an operative position. Additionally, the invention relates to a method for assembling a brush holder assembly to thus ease the assembly procedure.

2. Discussion

Brush riggings for motors and generators and the like vary in design, but in general consist of boxes to house the brushes, a spring means to apply pressure to the brushes to urge them against a commutator, connecting electrical leads to provide a current path to the brushes and a mounting surface to secure these elements to. The mounting surface also serves to provide some means to secure the entire assembly to the motor in such a manner as to place the brushes in a proper working relationship with the commutator. One of the most popular designs, especially for small fractional horsepower motors such as that disclosed in commonly assigned U.S. Pat. No. 4,694,214, which is hereby incorporated by reference, utilizes a molded brush card member of a one-piece construction formed from a high temperature resistant plastic which is electrically non-conductive. The member has the brush boxes formed thereon as well as various openings for securing it to the motor housing and for receiving an extending armature shaft and the commutator secured to the shaft.

Each of the brush boxes defines a cavity for receiving a brush and positioning the brush for reciprocating motion inwardly and outwardly. A length of conductive wire, commonly termed a "brush shunt", extends outwardly from the outboard end of the brush and terminates at a disk-like terminal cap. A coil spring is disposed about the brush shunt to extend between the terminal cap and the outboard end of the brush for urging the brush inwardly. A conductor is mounted to the terminal cap to conduct current to the motor as desired.

Although such a brush card arrangement has proven very satisfactory in operation, it is laborious to assemble the brushes into the brush card. This is because the coil spring must be compressed nearly to its "stacked" height and so held while the brush shunt is passed through the central hollow of the coil spring and then mounted to its terminal cap. Additionally, to replace a worn brush, the motor end cap must be removed to provide access to the brush card.

Accordingly, it is a principal object of the present invention to provide a brush holder assembly for a dynamoelectric machine wherein the brush shunt may be mounted to an electrically conductive terminal without the necessity of first compressing the brush spring.

It is another aspect of the present invention to provide an end cap which includes a brush housing for holding the brush holder assembly of the present invention whereby the brush holder assembly may be accessed without removing the motor end cap from the dynamoelectric machine.

It is yet another object of the present invention to provide a novel method of assembly of a brush holder whereby the brush holder assembly can be assembled without first compressing a coil spring associated therewith.

It is still another object of the present invention to provide an apparatus for biasing a brush outwardly of a brush box, and a method for assembling same without first compressing the biasing member, which does not require the use of any special components or especially constructed tools.

SUMMARY OF THE INVENTION

The above and other objects are accomplished by a method and apparatus relating to a brush holder end cap and a method of assembly, in accordance with preferred embodiments of the present invention, which significantly ease the assembly of a conventional brush holder assembly. The apparatus includes an electrical cable having a brush box cover slidably disposed thereon towards a first end portion of the electrical cable. A biasing member, preferably a coil spring, is slidably disposed over a portion of the electrical cable intermediate the brush box cover and a second end portion of the electrical cable. The second end portion is electrically secured by any conventional electrical securing means, such as an electrical crimp member, to an end portion of a brush shunt to enable a current path to be formed from the brush shunt to the electrical cable. An outer end portion of the brush shunt is electrically and mechanically secured to a brush member.

The preferred method of the present invention involves urging the brush box cover and the coil spring towards the second end portion of the electrical cable to fold the brush shunt so as to place it in general longitudinal alignment with the electrical cable, and such that the brush shunt is extending generally parallel to the electrical cable. The brush box cover is then further urged slidably towards the second end portion of the electrical cable so as to urge the spring over the brush shunt towards and into contact with the brush. The brush box cover is urged over the electrical cable until the securing means engages within a portion of the brush box cover. At this point the biasing member is compressed between the brush box cover and the brush member and held in a compressed configuration. The brush and spring may then be placed in a brush box and the brush box cover releasably secured to a portion of the brush box. Thus, the brush shunt can be secured to the electrical cable without first compressing and holding compressed the biasing member during the assembly process.

BRIEF DESCRIPTION OF THE DRAWINGS

The various advantages of the present invention will become apparent to one skilled in the art by reading the following specification and subjoined claims and by referencing the following drawings in which:

FIG. 1 is an elevational view of a brush holder assembly in accordance with a preferred embodiment of the present invention;

FIG. 2 is an enlarged elevational view of the brush box cover shown in FIG. 1;

FIG. 3 is an elevational view of the brush holder assembly after the brush box cover has been slidably urged over the electrical cable and rotated 90 degrees to secure it releasably to the electrical cable;

FIG. 4 is an enlarged view of the brush box cover shown in FIG. 2 in accordance with directional arrow 4—4 in FIG. 2, and also showing the crimp member and a portion of the brush shunt being releasably, wedgingly secured within a portion of the brush box cover; and FIG. 5 is a fragmentary exploded elevational view showing how the brush and brush box cover fit within the brush box.

DETAILED DESCRIPTION OF THE PREFERRED EMBODIMENT

Referring to FIG. 1, there is shown an end cap and brush holder assembly 10 in accordance with a preferred embodiment of the present invention. The brush holder assembly 10 comprises an electrical cable 12 having a first end portion 14 and a second end portion 16, a brush box cover 18 slidably disposed on the electrical cable 12, and a biasing member in the preferred form of a coil spring 20 disposed over a portion of the electrical cable 12 intermediate the brush box cover 18 and the second end portion 16. A brush shunt 22 having a brush member 24 electrically and mechanically coupled to an outer end 26 thereof is electrically secured to the second end portion 16 at an outer end portion 28 thereof via an electrical crimp member 30. The crimp member 30 is well known in the art and is applied via a conventional crimping tool to secure the outer end portion 28 of the brush shunt 22 to the second end portion 16. Thus, a complete current path is formed between the brush shunt 22, the crimp member 30 and the electrical cable 12. In the preferred embodiment the electrical cable 12 includes at its first end portion 14 an electrical terminal 32 electrically and mechanically coupled thereto.

With brief reference to FIGS. 2 and 4, the brush box cover 18 is shown in greater detail. The brush box cover 18 includes a raised portion 34 having an aperture 36 through which the electrical cable 12 is adapted to slidably extend. The brush box cover 12 can thus be slidably moved along the electrical cable 12 when the brush box cover 12 is orientated as shown in FIGS. 1 and 2.

With further reference to FIGS. 2 and 4, the raised portion 34 of the brush box cover 18 includes a generally square-shaped opening 38 formed therein which opens into communication with the aperture 36. Arm portions 40 help secure the brush box cover 18 to a conventional brush box as will be explained in greater detail momentarily.

With reference to FIGS. 1–4, the assembly of the apparatus 10 will now be described. With initial reference to FIG. 1, the brush box cover 18 is first slidably urged over the electrical cable 12 such that the electrical cable 12 extends through the aperture 36. The spring 20 is then slid over the electrical cable 12 into close proximity with the brush box cover 18. The outer end portion 28 of the brush shunt 22 is then electrically and mechanically secured to the second end portion 16 of the electrical cable 12 by securing crimp member 30 via a conventional crimping tool to the second end portion 16. At this point the brush box cover 18 is urged slidably upwardly in the drawing of FIG. 1 towards the brush member 24, which causes the brush shunt 22 to be folded so as to extend generally parallel to the electrical cable 14. Further sliding of the brush box cover 18 causes the spring 20 to be urged upwardly over the brush shunt 22 into contact with the brush member 24, as shown finally in FIG. 3, and to be compressed between the brush box cover 18 and the brush member 24. Further slight urging of the brush box cover 18 toward the brush member 24 causes the crimp member 30 and a portion of the brush shunt 22 to be wedged in the square shaped opening 38, as shown in FIG. 4, and held therein after the brush box cover 18 is released. In this regard it will be appreciated that the crimp member 30 preferably has a somewhat square outer shape after being crimped, which facilitates engagement within the opening 38. However, a square outer shape for the crimp member is not absolutely essential to satisfactory wedging of the crimp member 30 in the opening 38, provided the overall outer shape of the crimp member 30 is such as to enable a relatively tight fit in the opening 38. The outer end portion 28 of the brush shunt 22 immediately adjacent the crimp member 30 also helps significantly to cause the crimp member 30 to be wedgingly engaged in the opening 38.

Referring now to FIG. 5, the brush member 24 and spring 20 may be placed into a brush box 18a formed on an end cap 44 of a motor housing. The bush box 18a has shoulder portions 46 which latchingly releasably engage with the arm portions 40 to hold the spring 20 therein. The brush member 24 is placed within the brush box 18a prior to securing the brush box cover 18 thereto.

The apparatus and methods of the present invention thus allow a brush holder assembly to be quickly and easily assembled without first compressing the biasing spring and holding the spring compressed while securing the brush shunt to the electrical cable. It has been found that the method and apparatus described herein significantly eases the assembly of a brush holder mechanism without requiring any special components or tools. Moreover, with the apparatus and method of the present invention the motor end cap need not be removed to access the brush box 18a, such as when the spring 20 is replaced.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. An apparatus comprising:

an electric motor end cap having a brush box;

a brush box cover having a pair of arms extending generally perpendicular to a top, said pair of arms only being attached to each other at a planar surface of said top;

said brush box cover being fastened to said brush box;

a brush;

a flexible shunt connected to an end of said brush;

a flexible and conductive wire directly connected to said shunt by a crimp, crimped ends of said shunt and said wire pointing in the same direction in a parallel and overlapping relationship; and a spring contacting against said brush and surrounding at least a portion of said shunt;

said shunt and said crimp being entirely disposed within said brush box when said brush and said brush box cover are fastened to said brush box, said conductive wire exiting said motor end cap generally parallel to an armature shaft rotational axis.

2. The apparatus of claim 1 further comprising a barb inwardly extending from a distal end of at least one of said pair of arms, said barb having a solid and generally triangular cross sectional configuration.

3. The apparatus of claim 2 wherein said brush box peripherally extends beyond said end cap, said brush box has an undercut shoulder, said bar fastens said brush box cover to said shoulder, said pair of arms of said brush box cover contacts against external surfaces of said brush box.

4. The apparatus of claim 3 wherein said barb engages said shoulder in a disengagable snap fit manner.

5. The apparatus of claim 3 further comprising a second undercut shoulder disposed on an opposite face of said brush box from said first shoulder.

6. The apparatus of claim 1 wherein said pair of arms and said top define a generally cross-sectional inverted-U shape.

7. The apparatus of claim 6 further comprising a barb inwardly extending from distal ends of both of said pair of arms.

8. The apparatus of claim 1 further comprising:

said conductive brush having a rectangular cross-sectional shape; and said spring being helically coiled and being compressed between said brush box cover and said brush.

9. The apparatus of claim 1 wherein said crimp rests against said brush box cover.

10. The apparatus of claim 1 wherein said cover attaches to said motor in a screw-free manner.

11. The apparatus of claim 10 wherein said crimp connects said conductive wire to said shunt internal to said motor end cap.

12. The apparatus of claim 9 wherein said spring is coiled and surrounds said shunt, said spring is located between said brush and said conductive wire.

13. The apparatus of claim 1 wherein said shunt is connected to a generally flat upper surface of said brush, said upper surface of said brush has a generally polygonal periphery.

14. An apparatus comprising:

an electric motor end cap;

a raised brush box extending from a peripheral edge of said electric motor end cap, said brush box having a pair of oppositely depending undercut shoulders;

a brush;

said brush box further having a bore for receiving said brush inserted in a radial direction toward a center of said end cap, said brush box also having a channel disposed at an outer end of said bore and in a direction generally perpendicular to said bore;

a spring extending between said brush box cover and said brush;

said brush box cover attaching to said brush box in a disengagable, snap-fit and screw-free manner, said brush box having at least four side walls for internally receiving said brush, said side walls being formed as a single piece integral with said end cap;

a barb inwardly extending from a distal end of at least one of a pair of arms depending from said brush box cover, said barb having a solid and generally triangular cross sectional configuration;

a first flexible wire running through said bore and being entirely disposed within said brush box;

a second flexible wire being joined to said first wire and exiting said end cap by way of said channel; and a crimp joining said wires together and being entirely disposed between said brush box cover and said brush;

said first wire being at least partially surrounded by said spring.

15. The apparatus of claim 14 wherein all of said first wire is disposed within said end cap while said second wire exits said end cap generally perpendicular to a radial direction of said first wire.

16. The apparatus of claim 14 wherein said brush box has an undercut shoulder and said barb fastens said brush box cover to said shoulder.

17. The apparatus of claim 16 further comprising a second undercut shoulder disposed on an opposite face of said brush box from said first shoulder.

18. The apparatus of claim 14 wherein said pair of arms and a top define a generally cross-sectional inverted-U shape, a tab projects from a portion of an edge of said top, said edge spanning between said pair of arms.

19. The apparatus of claim 14 wherein said spring is helically coiled and is longitudinally compressed between said brush box cover and said brush.

* * * * *